No. 678,503. Patented July 16, 1901.
B. MARRIOTT.
LIFTING JACK.
(Application filed May 9, 1901.)
(No Model.)
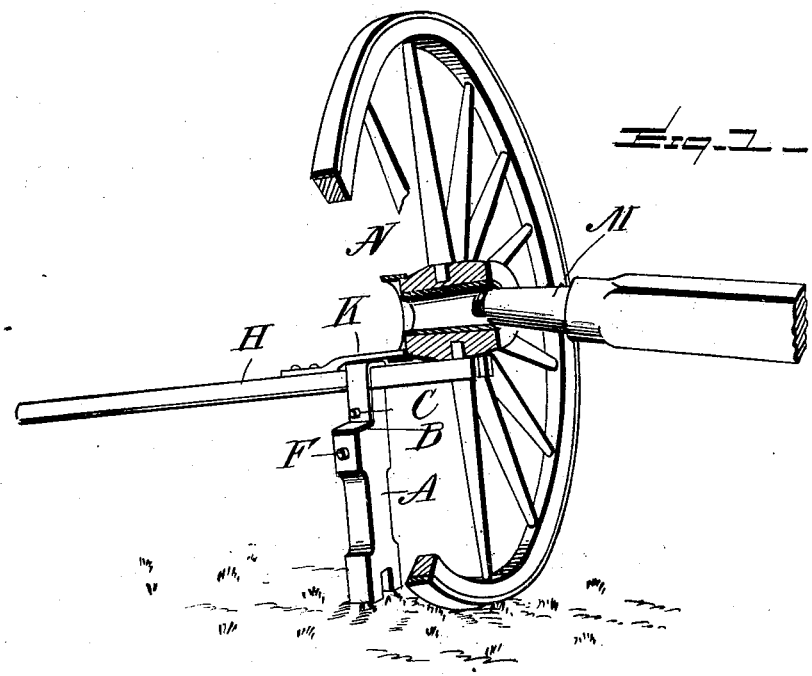
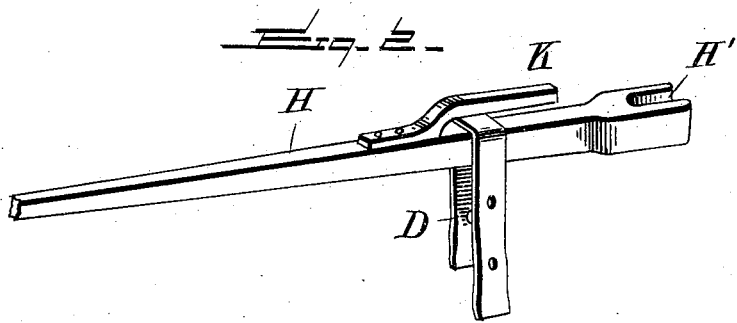
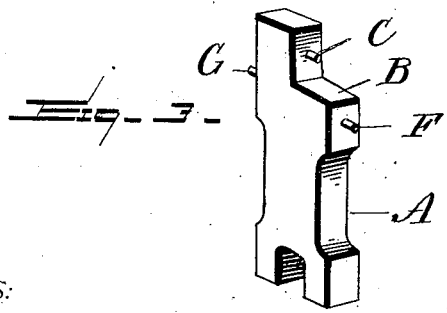
WITNESSES:
INVENTOR
Benjamin Marriott,
BY Franklin H. Hough
Attorney

UNITED STATES PATENT OFFICE.

BENJAMIN MARRIOTT, OF PLAIN CITY, UTAH.

LIFTING-JACK.

SPECIFICATION forming part of Letters Patent No. 678,503, dated July 16, 1901.

Application filed May 9, 1901. Serial No. 59,478. (No model.)

*To all whom it may concern:*

Be it known that I, BENJAMIN MARRIOTT, a citizen of the United States, residing at Plain City, in the county of Weber and State of Utah, have invented certain new and useful Improvements in Lifting-Jacks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in lifting-jacks, and especially to a jack comprising a stepped standard, to which a strap is secured for holding the hoisting-lever thereon, one end of said lever being notched and designed to engage a spoke, while a bracket-arm is secured to the side of the lever which engages the end of the hub of the wheel, whereby the wheel of a vehicle may be partially withdrawn from the bearing end of the axle and held at an angle to the axle.

The invention will be hereinafter more fully described and then specifically defined in the appended claims, and is illustrated in the accompanying drawings, which, with the letters of reference marked thereon, form a part of this application, and in which drawings—

Figure 1 is a perspective view of my improved lifting-jack, shown as holding a wheel of a vehicle nearly off the end of the axle. Fig. 2 is a detail view of the lifting-lever. Fig. 3 is a detail view of the stepped standard of the lifting device over which the lever is fulcrumed.

Reference now being had to the details of the drawings by letter, A designates the standard of the lifting-jack, which has one or more steps B cut in one of its longitudinal edges near its upper end. Fastened to the upright wall of said step is a pin C, to which one end of the strap D is fastened. Said strap has a series of perforations E, whereby it may be adjustably held about levers of different sizes. On the opposite edges of the standard, adjacent to its stepped portion, are fastened pins F and G, whereby said strap may be caught over one or the other of said pins after the strap has been passed about a lever H when said lever is seated or fulcrumed on the highest or the stepped portion of the standard, accordingly as it may be desired to regulate the height at which it is desired to use the jack.

One end of the lever H is notched, as at H', which notch is adapted to straddle one of the spokes of the vehicle-wheel adjacent to the hub thereof, as illustrated in the drawings. Fastened to one side of the lever is a bracket-arm K, which is designed to engage over the edge of the hub-band N of the wheel, whereby as the operator presses down on the end of the lever said bracket-arm will pull down on said hub-band and the wheel after sliding substantially the length of the bearing-surface of the axle M will be held in the position shown in the drawings while the axle is being lubricated.

Having thus described my invention, what I claim to be new, and desire to secure by Letters Patent, is—

1. A lifting-jack comprising a standard which is stepped, a strap secured at one end to the upright wall of said stepped portion, pins on the opposite edges of said standard, one above and the other below the step, a lifting-lever adapted to be fulcrumed over the top or step of said standard and held thereto by said strap, as set forth.

2. A lifting-jack comprising a standard which is stepped, a perforated strap secured to the upright wall of the stepped portion, pins on the opposite edges of the standard designed to be engaged by said strap, a lifting-lever held by said strap on the top of stepped portion of the standard, the end of the lever being notched, and a bracket-arm fastened to the side thereof and designed to engage the hub-band of a vehicle-wheel, as set forth.

In testimony whereof I hereunto affix my signature in presence of two witnesses.

BENJAMIN MARRIOTT.

Witnesses:
F. J. HENDERSHOT,
WM. H. GAMPTON.